(12) United States Patent
Savvides et al.

(10) Patent No.: US 12,322,012 B2
(45) Date of Patent: Jun. 3, 2025

(54) SYSTEM AND METHOD FOR SCENE RECTIFICATION VIA HOMOGRAPHY ESTIMATION

(71) Applicant: CARNEGIE MELLON UNIVERSITY, Pittsburgh, PA (US)

(72) Inventors: Marios Savvides, Pittsburgh, PA (US); Uzair Ahmed, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/272,301

(22) PCT Filed: Apr. 1, 2022

(86) PCT No.: PCT/US2022/022986
§ 371 (c)(1),
(2) Date: Jul. 13, 2023

(87) PCT Pub. No.: WO2022/212804
PCT Pub. Date: Oct. 6, 2022

(65) Prior Publication Data
US 2024/0071024 A1 Feb. 29, 2024

Related U.S. Application Data

(60) Provisional application No. 63/170,230, filed on Apr. 2, 2021.

(51) Int. Cl.
*G06T 11/60* (2006.01)
*G06T 3/60* (2006.01)
(Continued)

(52) U.S. Cl.
CPC ............... *G06T 11/60* (2013.01); *G06T 3/60* (2013.01); *G06T 17/00* (2013.01); *G06T 19/20* (2013.01); *G06V 10/245* (2022.01); *G06V 10/25* (2022.01); *G06V 10/44* (2022.01); *G06V 10/56* (2022.01); *G06V 10/761* (2022.01); *G06V 10/764* (2022.01); *G06V 10/82* (2022.01);
(Continued)

(58) Field of Classification Search
CPC ............ G06T 11/60; G06T 3/60; G06T 17/00
See application file for complete search history.

(56) References Cited

U.S. PATENT DOCUMENTS

2017/0284799 A1* 10/2017 Wexler ...................... G06T 7/62
2020/0117920 A1* 4/2020 Lee .......................... G06T 17/05

OTHER PUBLICATIONS

International Search Report and Written Opinion for the International Application No. PCT/US2022/022986, mailed Aug. 17, 2022, 6 pages.

* cited by examiner

*Primary Examiner* — Edward Park
(74) *Attorney, Agent, or Firm* — KDW FIRM PLLC (57) ABSTRACT

Disclosed herein is a system and method for performing pose-correction on images containing objects within a scene, or the entire scene, to compensate for off-centered camera views. The system and method generates a more frontal view of the object or scene by applying planar homography by identifying corner endpoints of the object or the scene and repositioning the corner endpoints to provide a more frontal view. The pose-corrected scene may then be input to an object detector to determine a location of a bounding box of an object-of-interest which would be more accurate than a bounding box from the original off-centered image.

8 Claims, 6 Drawing Sheets

(51) Int. Cl.
*G06T 17/00* (2006.01)
*G06T 19/20* (2011.01)
*G06V 10/24* (2022.01)
*G06V 10/25* (2022.01)
*G06V 10/44* (2022.01)
*G06V 10/56* (2022.01)
*G06V 10/74* (2022.01)
*G06V 10/764* (2022.01)
*G06V 10/82* (2022.01)
*G06V 20/50* (2022.01)
*G06V 20/68* (2022.01)

(52) U.S. Cl.
CPC .............. *G06V 20/50* (2022.01); *G06V 20/68* (2022.01); *G06T 2219/2016* (2013.01)

SYSTEM AND METHOD FOR SCENE RECTIFICATION VIA HOMOGRAPHY ESTIMATION

RELATED APPLICATIONS

This application claims the benefit of U.S. Provisional Patent Application No. 63/170,230, filed Apr. 2, 2021, the contents of which are incorporated herein in their entirety.

BACKGROUND

In a retail setting, it is desirable to be able to use computer vision methods to detect and identify products on a retail shelf to aid in management of the retail establishment. For example, computer vision may be used to detect and identify products for various tasks, such as tracking product inventory, determining out-of-stock products and determining misplaced products. Product detection is one of the fastest-moving areas and plays a fundamental role in many retail applications such as product recognition, planogram compliance, out-of-stock management, and check-out free shopping.

To this end, numerous computer vision methods have been developed and many real-world applications based on those computer vision methods perform at a satisfactory level. Currently, various visual sensors (e.g., fixed cameras, robots, drones, and mobile phones) have been deployed in retail stores, enabling the application of advanced technologies to ease shopping and store management tasks.

Object detectors typically comprise a localization sub-network that feeds downstream tasks, such as pose estimation, fine-grained classification, and similarity matching. Most downstream tasks require that the localization sub-network provide a bounding area for each object, for example, products in a retail setting. Therefore, for scene understanding in 2D images, the first step is to detect the objects and represent them by 2D bounding boxes. It is crucial to ensure that the bounding boxes are well aligned with the detected objects to provide accurate information about the products for the downstream tasks. The bounding box is expected to cover the most representative pixels and accurately locate the product while concurrently excluding as much noisy context, as possible, such as background. Retail scene product detection typically output axis-aligned bounding boxes (AABB) regardless of the pose of the product.

Figure 1:
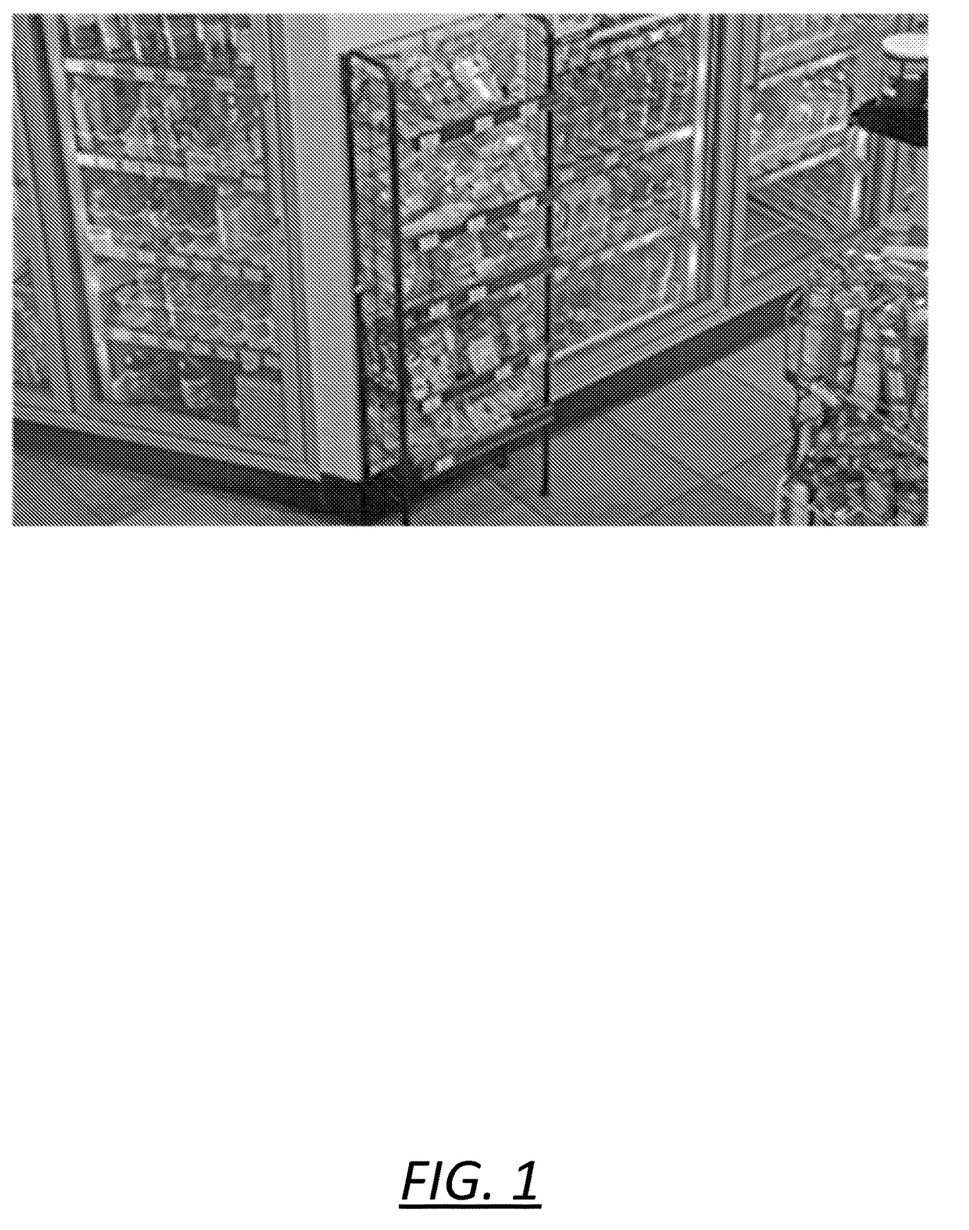
FIG. 1 is an illustration showing a typical off-centered image captured in a retail setting.

However, products can be of arbitrary poses in a real-world retail scene, especially when the image is taken by a camera not facing straight towards the shelf, as shown in FIG. 1. Cameras responsible for imaging the retail scene shown in FIG. 1, which may be, for example, cameras mounted on a mobile robotic inventory system, may be unable to obtain a straight-on, centered view of the shelves or of products on the shelves. In this case, only a restricted-angle image is able to be captured.

Because of mutual occlusion, rotation, distortion, and restricted shooting angles in retail scenarios, previous datasets and detectors have difficulty drawing proper bounding boxes to satisfy requirements of downstream processes. This is because an AABB bounding box is not able to be perfectly aligned with the actual boundaries of the ill-posed products. If AABB bounding boxes are used as the bounding box shape to annotate the products, there will always be irrelevant background included in the boxes or parts of the products will be cut out. As such, the most precise object regions cannot be retrieved. Therefore, the features extracted from these object regions may not be accurate for the downstream tasks.

SUMMARY

To address the issues identified above, disclosed herein is a system and method implementing a pose-correction method in which the view is altered before the bounding box is determined to correct or partially correct the view to obtain a more frontal view of the objects. In one embodiment, the objects may be, for example, retail products and the images may be images of the shelves of the retail establishment collected by static or mobile cameras.

The method uses planar homography to correct the pose by fitting corner endpoints of the image, or of one or more object-of-interest in the image, to a different configuration that provides a more frontal view of the object-of-interest.

The present invention may be utilized with, or become part of systems and methods described in the following U.S. Patent Applications, the contents of which are incorporated herein in their entireties: Ser. No. 17/425,089, filed Jul. 22, 2021, entitled "System and Method for Determining Out-Of-Stock Products", Ser. No. 17/425,290, filed Jul. 22, 2021, entitled "System and Method for Associating Products and Product Labels", and Ser. No. 17/425,293, filed Jul. 22, 2021, entitled "System and Method for Detecting Products and Product Labels".

BRIEF DESCRIPTION OF THE DRAWINGS

By way of example, a specific exemplary embodiment of the disclosed system and method will now be described, with reference to the accompanying drawings, in which.

DETAILED DESCRIPTION

The present invention is directed to a system and method for identifying objects-of-interest (e.g., products in a retail setting). Images of shelves containing the objects-of-interest are collected, in some instances by fixed cameras or in some instances by mobile robotic cameras. Images of individual objects-of-interest may be identified on the shelf and submitted to a classifier for identification. Identified objects-of-interest may be used, for example, to determine inventory levels or to determine out-of-stock or misplaced products.

In some instances, cameras may capture images of products that are off-centered, as shown in FIG. 1, depicting a stand-alone shelf of products which has been collected by a camera at an off-centered point-of-view. When a trained object detector attempts to fit a bounding box around the objects-of-interest shown, extraneous information may be included within the bounding boxes, leading to a greater difficulty for downstream tasks, for example, a classification task to identify the products. Therefore, the objective of the invention is to provide an imaging processing pipeline that includes the step of pose-correcting images which are collected from off-center viewpoints before submitting the images to a trained object detector.

Figure 5:
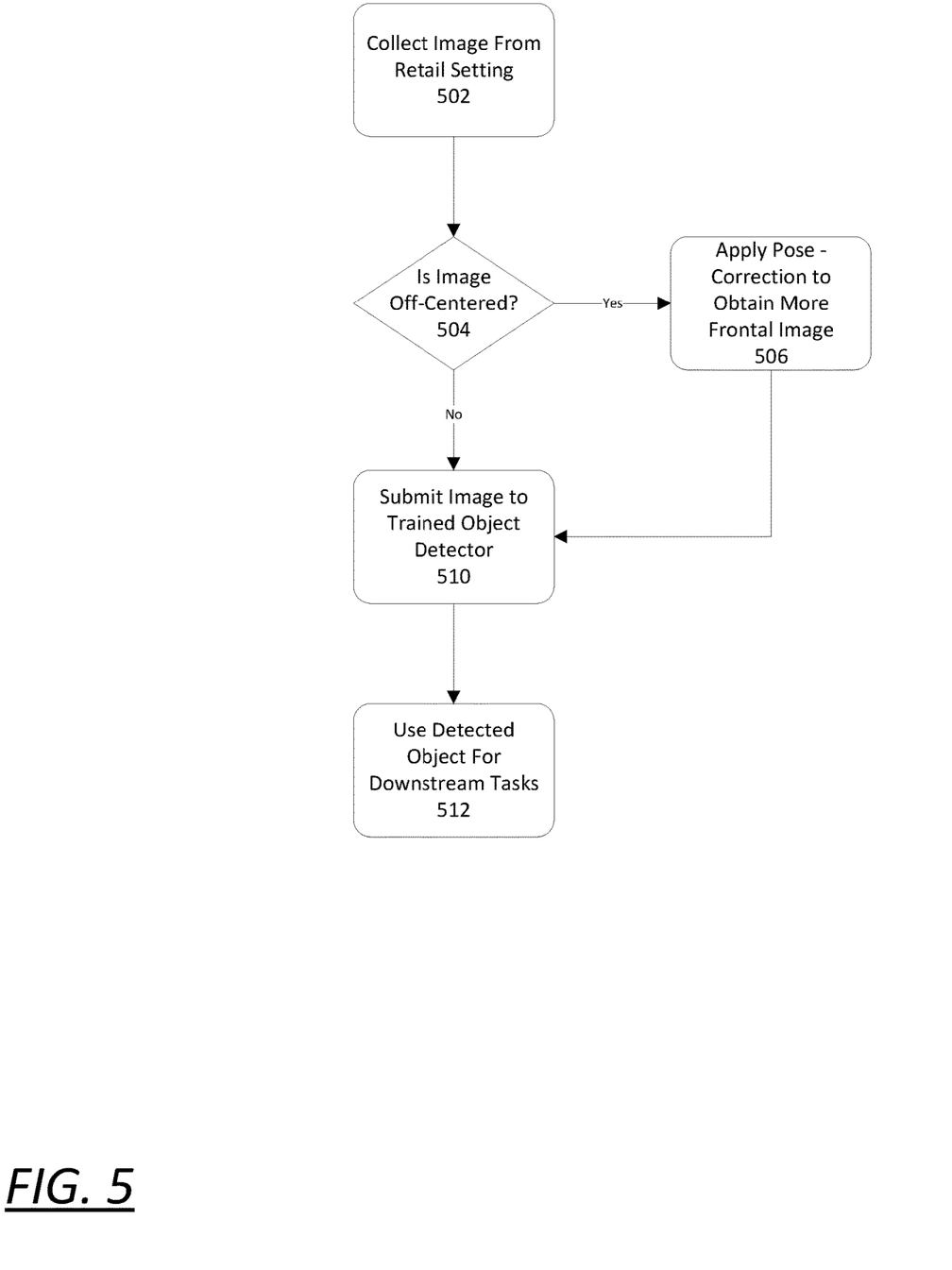
FIG. 5 is a flowchart depicting the steps of a method of collecting images from a retail setting and preparing the images for use in various downstream tasks.

The overall process is shown in flowchart form in FIG. 5. At 502, an image is collected from a retail setting by, for example, a mobile robotic camera or a stationary mounted camera. In some instances, multiple images from an aisle within the retail setting may be stitched together to form a panoramic image of the aisle. All or some portion of the panoramic image may need to be pose-corrected, either prior to or after individual images have been stitched together to form the planogram.

At step 504 it is determined if the image or objects-of-interest within the image are off-centered. In some embodiments, the determination may be made by a trained machine learning model trained to detect off-center images or objects-of-interest within an image. If it is determined that the image or the objects-of-interest are off centered, the method proceeds to step 506, where the pose-correction methodologies of the present invention are applied to obtain a more frontal view.

It should be noted that the pose correction may be applied to either the entire image or to only portions of the image showing objects-of-interest. A trained object detector may be used to determine one or more off-center objects-of-interest within the overall image and may determine bounding boxes containing the off-centered objects-of-interest. Once the off-centered image or objects-of-interest have been pose-corrected, to the extent possible, at step 510, the pose-corrected image or objects-of-interest may be submitted to a trained object detector which may determine bounding boxes enclosing the pose-corrected objects-of-interest. The bounding boxes determined in this step may be used by downstream tasks at step 512. For example, the bounding boxes may be submitted to a trained classifier to identify the objects-of-interest. At step 504, if it is determined that the image or objects-of-interest are not off-centered, no pose-correction is applied and the image is submitted directly to the trained object detector to determine bounding boxes for any objects-of-interest shown in the image.

The goal of the pose-correction step 506 in FIG. 5 is to pose-correct, to the extent possible, an off-centered image or objects-of-interest to a more frontal view. As should be realized, it may not be possible to get a perfectly frontal view of the objects-of-interest, however, the greater the extent of the pose-correction to a more frontal view, the greater the benefit to downstream tasks such as object detection and/or product classification.

To perform the pose-correction step 506, a homography technique may be applied to the image. Homography estimation is a well-known tool in computer vision for changing the viewpoint of a scene. It essentially performs a perspective projection on the scene to change the viewpoint of the scene to an arbitrary location. The perspective projection generates images or videos with objects under various pose angle views. The pose-correction of the present invention disclosed herein helps the downstream detection and identification systems by providing more accurate input. This system and method transforms the off-centered viewpoints of the scene to make them frontal, or as close to frontal as possible. This transformation will help downstream object detectors to generate stable bounding boxes on the scene which will in turn help the classification process leading to identification of the objects-of-interest.

Figure 2:
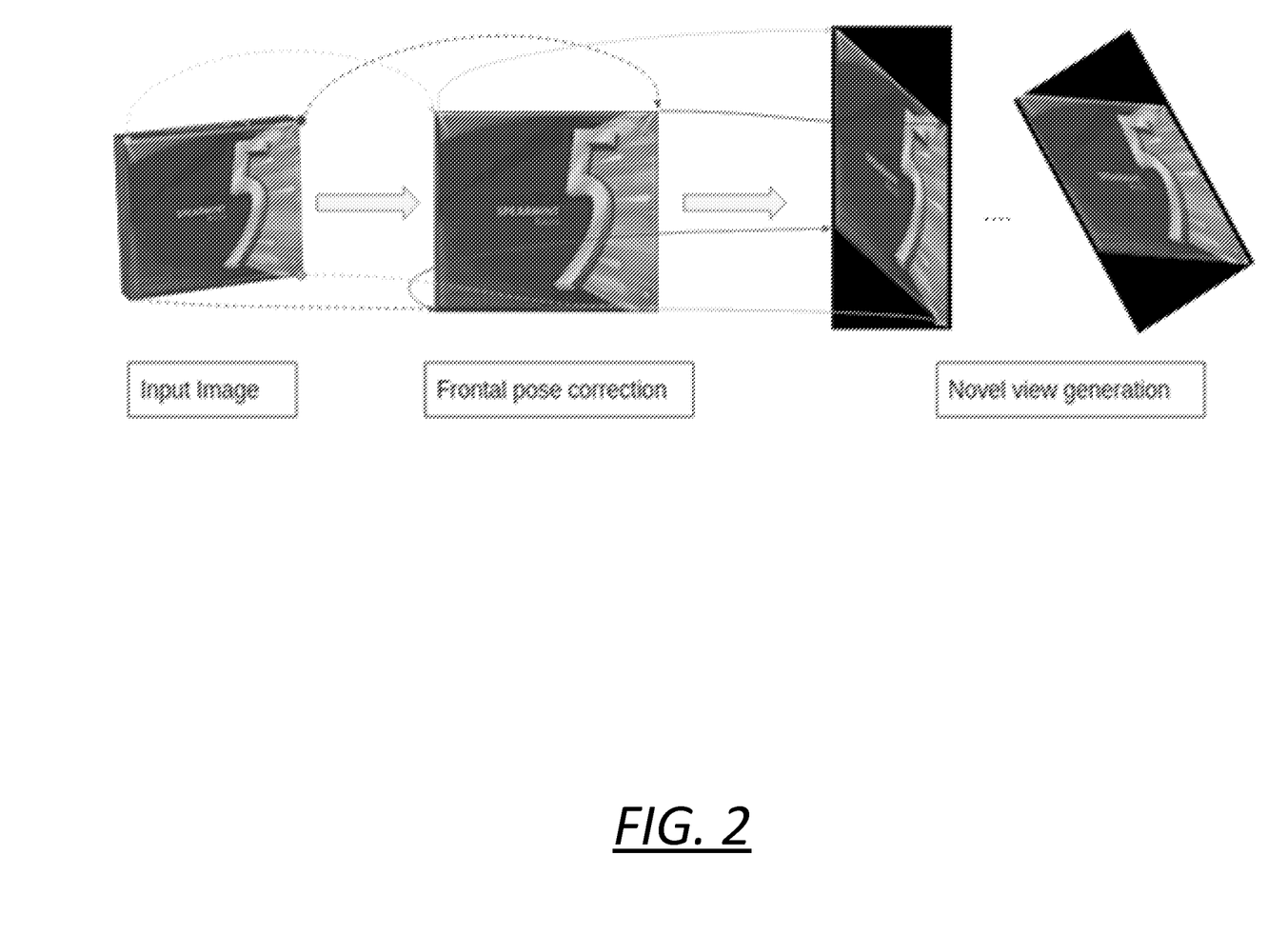
FIG. 2 is an illustration showing the procedure of applying planar homography to provide a more frontal view of an object.

Planar homography is a powerful tool that can be leveraged to fit images to arbitrary poses as long as all the corresponding points maintain the same depth. This technique approach is illustrated in FIG. 2 with respect to a single retail product. A novel view is generated by fitting the corner end points of the image to different configurations, thereby simulating different views.

As applied to the scene shown in FIG. 1, the method transforms the viewpoint of the scene to make it more suitable for downstream tasks, such as object detection, localization and classification. As previously stated, FIG. 1 shows a section in a retail store captured through a pan/tilt camera. The free-standing shelf is the area of interest and the angle position of the shelf makes it harder for the object detectors to generate high intersection-over union (IOU) bounding boxes on the objects-of-interest.

Getting correctly-positioned IOU bounding boxes is critical as these bounding boxes are used to crop the object from the scene and to extract a feature embedding for identification. Changes in the bounding box distribution will result in pixel distribution changes on the crops, thus affecting the feature embedding. To avoid this, the detectors need to generate tight and accurate bounding boxes on the objects. Planar homography is thus used to change the viewpoint of the scene such that it becomes suitable to generate more efficient bounding boxes.

Within a panoramic image of the retail setting, as shown in FIG. 1, the four endpoints of the area of interest are marked and are used as input points. For every input point, there is a corresponding output point which is chosen such that the region of interest appears to be frontal as shown in the images depicted in FIG. 3.

FIG. 1 shows an actual image from a retail setting where the area of interest is the free-standing shelf. By using perspective transforms, the viewpoint is able to be modulated such that the image appears to have been captured from a more-frontal camera position, as shown by the image in FIG. 3.

Figure 4:
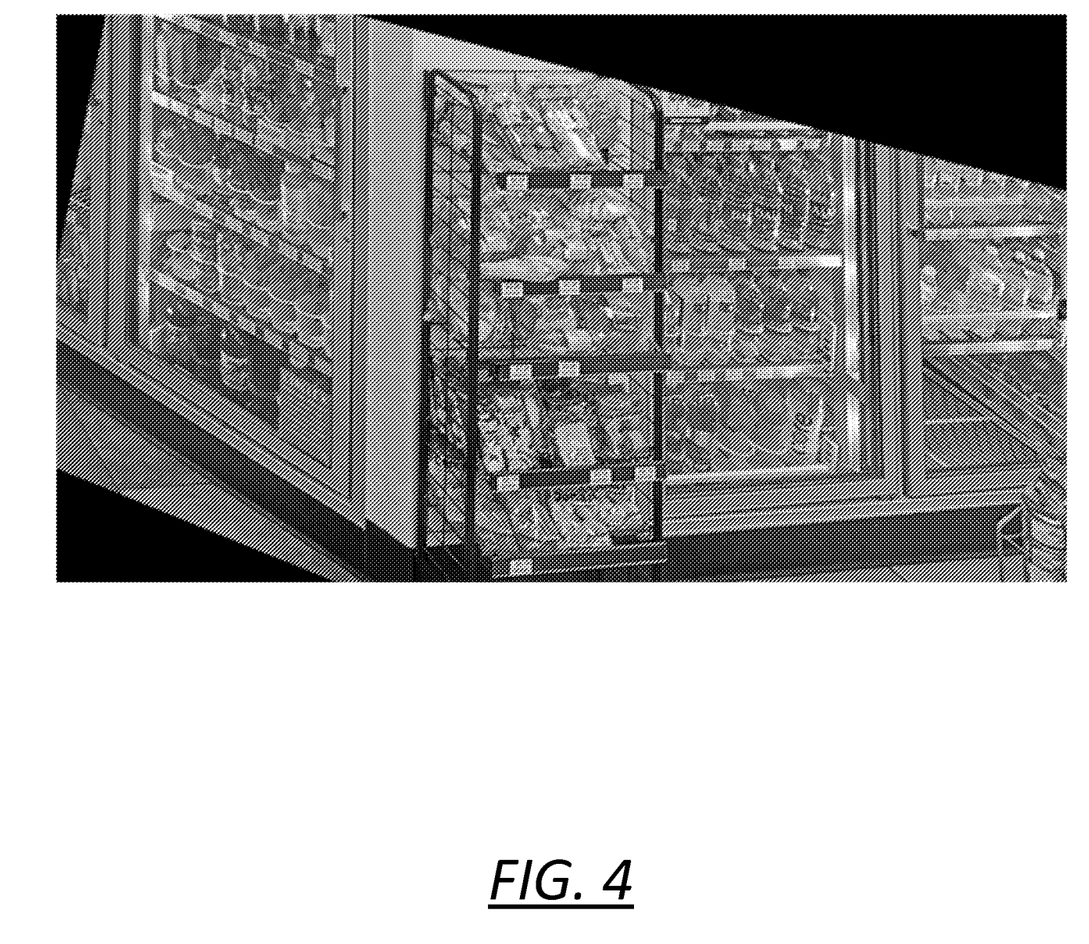
FIG. 4 is an illustration showing the technique applied to the entire scene show in the image of FIG. 1.

The described method is not limited to changing the viewpoint of a region of interest in an image, but can be applied to the entire scene, resulting in the image shown in FIG. 4.

In the case of objects-of-interest where the sides are visible, an additional optional step can be added to first pose-correct the image such that only the front facing of the product is visible. The described homography method is then applied to map the four endpoints of the image to different point configurations to simulate novel frontal views of the products.

Figure 3:
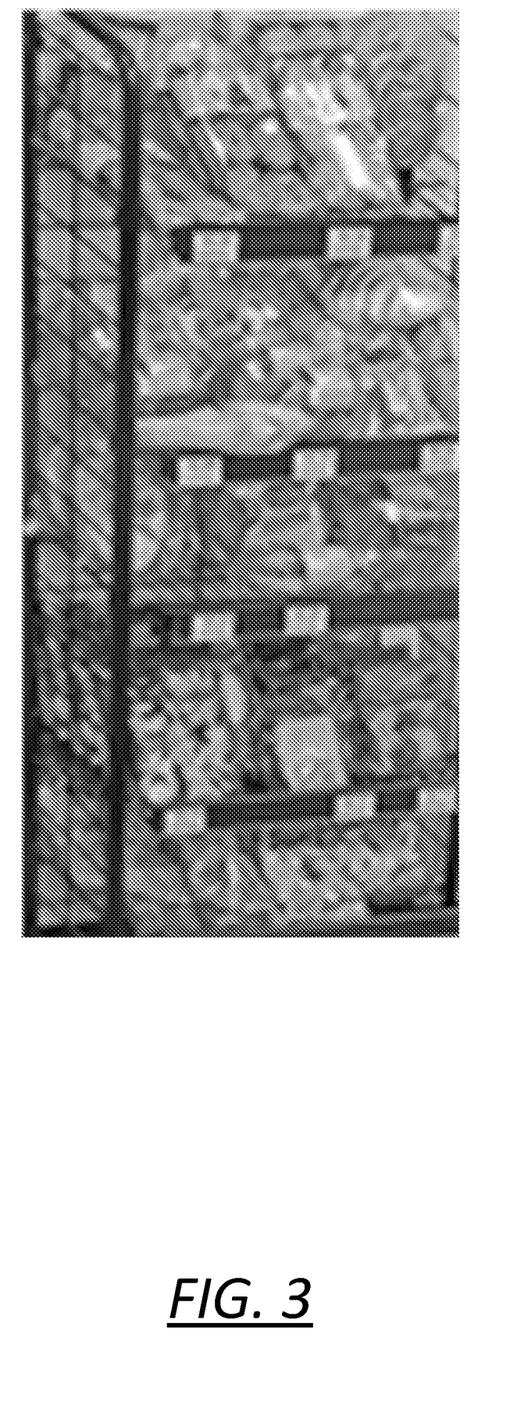
FIG. 3 is an illustration showing the corrected view of the region of interest from the image of FIG. 1.
Figure 6:
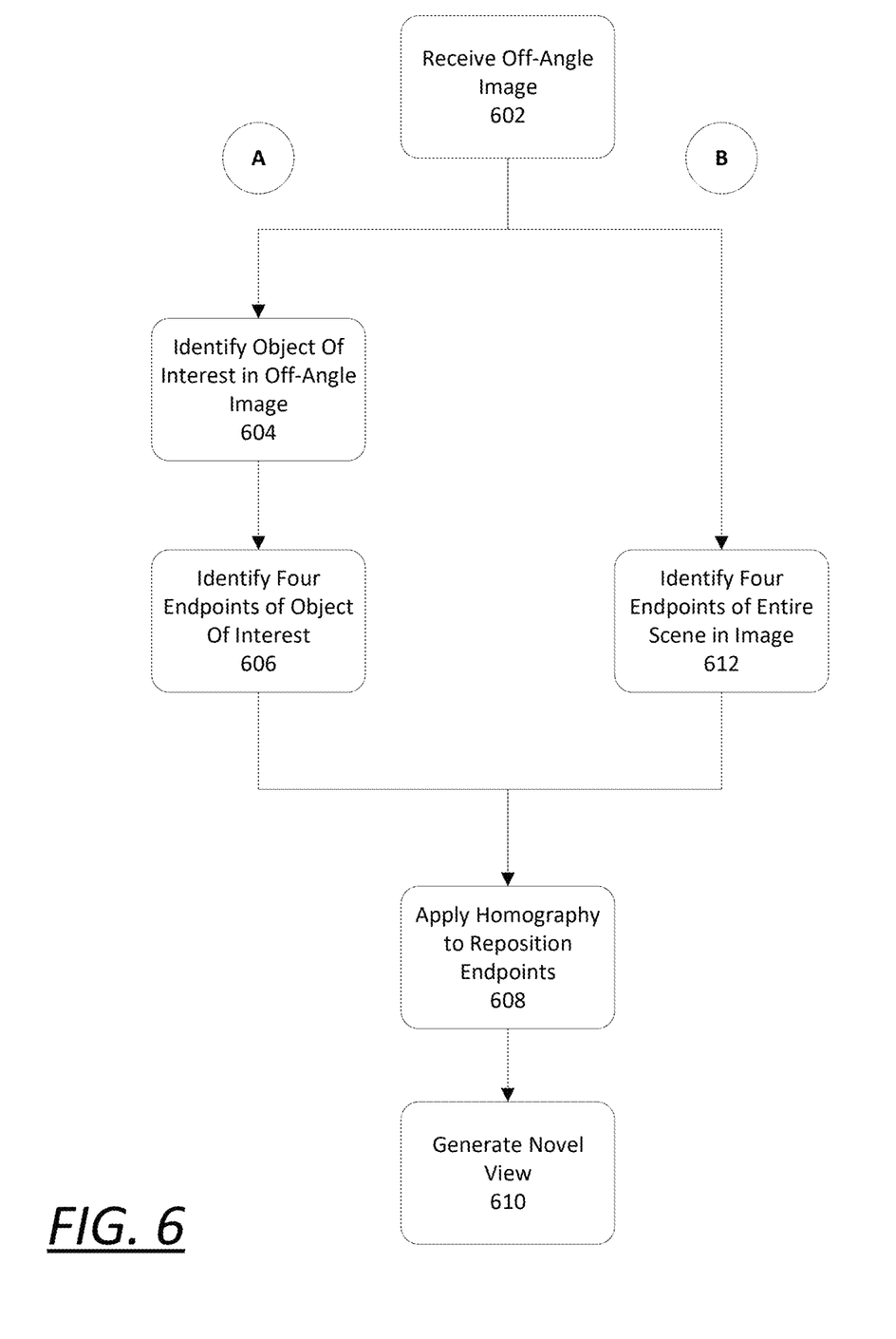
FIG. 6 is a flowchart depicting the steps of the method of a applying the post-correction method described herein.

A flowchart of the pose-correction process of step 506 in FIG. 5 is shown in FIG. 6. At 602, an off-centered image is received. An exemplary off-centered image is shown in FIG. 1. In a first embodiment, path "A" of the flowchart covers the case wherein the pose-correction is made for objects-of-interest depicted in the image. At step 604, the objects-of-interest are identified in the off-centered image and, at step 606, the four endpoints of the objects-of-interest are identified. The four endpoints may be, for example, the four corners of a rectangle enclosing the off-centered object-of-interest. At step 608, homography is applied to reposition the identified endpoints and, at 608, the novel view of the scene is generated based on the repositioned endpoints at step 608. FIG. 3 shows an exemplary post-corrected version of the object of interest shown in FIG. 1.

In a second embodiment of the invention, path "B" of the flowchart covers the case wherein the entire scene depicted in the off-centered image is to be pose-corrected. In this case, the identified endpoints would be the four corners of the overall image, which are identified at step 612. The process then proceeds as previously described with path "A", wherein homography is applied to reposition the endpoints at step 608 and a novel view is generated at step 610. FIG. 4 shows an exemplary pose-corrected version of the entire scene in the image shown in FIG. 1.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method comprising:
 collecting an image containing one or more objects-of-interest;
 determining that objects-of-interest appearing in the image have been captured from an off-centered point-of-view;
 submitting the image to a trained object detector to determine bounding boxes enclosing objects-of-interest in the image;
 for each object-of-interest in the image:
  identifying corner endpoints of the object-of-interest;
  applying homography to reposition the identified endpoints; and
  generating a novel view of the object-of-interest based on the repositioned endpoints, the novel view comprising a more frontal view of the object-of-interest; and
 submitting the bounding boxes to one or more downstream tasks.

2. The method of claim 1, wherein the objects-of-interest within the image are identified via a trained object detector.

3. The method of claim 2, wherein the step of determining that the objects-of-interest within the image are off-centered comprises:
 submitting the objects identified by the trained object detector to a machine learning model trained to detect objects that have been captured from an off-centered point-of-view.

4. The method of claim 1 wherein the one or more downstream tasks include a classifier for identifying the objects-of-interest.

5. A system for performing pose correction on an image captured from an off-centered point-of-view comprising:
 a processor; and
 software that, when executed by the processor, cause the system to:
  collect an image containing one or more objects-of-interest;
  determine that one or more objects-of-interest appearing in the image have been captured from an off-centered point-of-view;
  submit the image to a trained object detector to determine bounding boxes enclosing objects-of-interest in the image;
  for each object-of-interest:
   identify corner endpoints of the object-of-interest;
   apply homography to reposition the identified endpoints; and
   generate a novel view of the object-of-interest based on the repositioned endpoints, the novel view comprising a more frontal view of the object-of-interest; and
  submit the bounding boxes to one or more downstream tasks.

6. The system of claim 5, wherein the objects-of-interest within the image are identified via a trained object detector.

7. The system of claim 6, the software performing the step of determining that the objects-of-interest within the image are off-centered by causing the system to:
 submit the objects identified by the trained object detector to a machine learning model trained to detect objects captured from an off-centered point-of-view; and
 receiving an indication that the objects in the image were captured from an off-centered point-of-view.

8. The system of claim 5 wherein the one or more downstream tasks include a classifier for identifying the objects-of-interest.

* * * * *